United States Patent
Cao et al.

(10) Patent No.: US 12,169,938 B2
(45) Date of Patent: Dec. 17, 2024

(54) PRODUCT RELEASE METHOD AND IMAGE PROCESSING METHOD, APPARATUS, DEVICE, AND STORAGE MEDIUM

(71) Applicant: ALIBABA GROUP HOLDING LIMITED, Grand Cayman (KY)

(72) Inventors: Jian Cao, Hangzhou (CN); Bang Zhang, Hangzhou (CN); Yinghui Xu, Hangzhou (CN); Pan Pan, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 174 days.

(21) Appl. No.: 17/170,846

(22) Filed: Feb. 8, 2021

(65) Prior Publication Data

US 2021/0248755 A1    Aug. 12, 2021

(30) Foreign Application Priority Data

Feb. 10, 2020  (CN) .......................... 202010084763.4

(51) Int. Cl.
*G06K 9/00* (2022.01)
*G06N 20/00* (2019.01)
(Continued)

(52) U.S. Cl.
CPC ............ *G06T 7/194* (2017.01); *G06N 20/00* (2019.01); *G06T 3/02* (2024.01); *G06T 5/70* (2024.01); *G06T 5/75* (2024.01); *G06T 7/12* (2017.01)

(58) Field of Classification Search
CPC ........... G06Q 30/0643; G06Q 30/0631; G06Q 30/0625; G06Q 30/0627; G06Q 30/0283;
(Continued)

(56) References Cited

U.S. PATENT DOCUMENTS

| 9,595,059 B2 | 3/2017 | Knudson et al. |
| 9,684,987 B1 | 6/2017 | Dhua |
| (Continued) | | |

FOREIGN PATENT DOCUMENTS

| CA | 2792336 C | 7/2018 |
| CN | 103778538 A | 5/2014 |
| (Continued) | | |

OTHER PUBLICATIONS

Yang, Wei, Ping Luo, and Liang Lin. "Clothing co-parsing by joint image segmentation and labeling." Proceedings of the IEEE conference on computer vision and pattern recognition. 2014. p. 7 (Year: 2014).*

(Continued)

*Primary Examiner* — Gregory A Morse
*Assistant Examiner* — Owais Iqbal Memon

(57) ABSTRACT

Embodiments of this specification provide methods and apparatuses for processing images, devices, and storage media. A method includes: obtaining an image for processing; generating a first mask image corresponding to the image based on a machine-learning model and determining whether the image has a foreground object; in response to determining that the image has the foreground object, setting pixels corresponding to the foreground object to a first grayscale value range, and setting pixels corresponding to non-foreground objects in the first mask image to a second grayscale value range; determining an outline corresponding to the foreground object in the image according to a grayscale value range difference between the first grayscale value range of the foreground object and the second grayscale value range of the non-foreground objects in the first mask image; and sending, to a client device for display, the image with the determined outline for interaction by a user.

15 Claims, 8 Drawing Sheets

(51) Int. Cl.
*G06T 3/02* (2024.01)
*G06T 5/70* (2024.01)
*G06T 5/75* (2024.01)
*G06T 7/12* (2017.01)
*G06T 7/194* (2017.01)

(58) Field of Classification Search
CPC ....... G06F 3/0484; G06T 7/564; G06T 7/194; G06T 5/004; G06T 7/12; G06T 2207/20081; G06T 2207/20084; G06T 2207/20132; G06T 7/11; G06T 7/13; G06T 2207/10016; G06N 3/0454; G06N 20/00
See application file for complete search history.

(56) References Cited

U.S. PATENT DOCUMENTS

| | | | |
|---|---|---|---|
| 9,965,865 B1* | 5/2018 | Agrawal | G06V 10/7747 |
| 10,049,308 B1* | 8/2018 | Dhua | G06T 11/60 |
| 10,140,652 B2 | 11/2018 | Adeyoola et al. | |
| 10,169,911 B2 | 1/2019 | Holzer et al. | |
| 10,698,558 B2 | 6/2020 | Holzer et al. | |
| 10,725,609 B2 | 7/2020 | Holzer et al. | |
| 10,755,341 B2 | 8/2020 | Rhoads | |
| 10,803,363 B2 | 10/2020 | Lee et al. | |
| 10,891,485 B2 | 1/2021 | Anorga et al. | |
| 11,004,208 B2* | 5/2021 | Price | G06N 3/045 |
| 11,244,170 B2* | 2/2022 | Zhang | G06V 10/26 |
| 2015/0178786 A1 | 6/2015 | Claessens | |
| 2017/0213112 A1 | 7/2017 | Sachs et al. | |
| 2017/0228872 A1* | 8/2017 | An | G06T 7/194 |
| 2018/0047192 A1* | 2/2018 | Kristal | G06T 11/60 |
| 2018/0089735 A1 | 3/2018 | Lenahan et al. | |
| 2018/0278737 A1* | 9/2018 | Posa | H04N 1/00307 |
| 2019/0114836 A1 | 4/2019 | Holzer et al. | |
| 2020/0020108 A1* | 1/2020 | Pao | G06T 7/90 |
| 2020/0273090 A1 | 8/2020 | Ayush et al. | |
| 2021/0241500 A1* | 8/2021 | Chen | G06N 20/00 |

FOREIGN PATENT DOCUMENTS

| | | |
|---|---|---|
| CN | 106778813 A | 5/2017 |
| CN | 108447064 A | 8/2018 |
| CN | 108833881 A | 11/2018 |
| CN | 109068060 A | 12/2018 |
| CN | 109377509 A | 2/2019 |
| CN | 109597907 A | 4/2019 |
| CN | 109977983 A | 7/2019 |
| CN | 110536151 A | 12/2019 |
| CN | 110610509 A | 12/2019 |
| DE | 112018001822 T5 | 12/2019 |
| EP | 3408848 A1 | 12/2018 |
| KR | 20180051449 * | 5/2018 ............. G06Q 30/02 |
| WO | 2018154331 A1 | 8/2018 |

OTHER PUBLICATIONS

Howard, Andrew, et al. "Searching for mobilenetv3." Proceedings of the IEEE/CVF international conference on computer vision. 2019. p. 1 (Year: 2019).*
Chu, Xiangxiang, Bo Zhang, and Ruijun Xu. "MoGA: Searching Beyond MobileNetV3." arXiv preprint arXiv:1908.01314 (2019). p. 1 (Year: 2019).*
Yang, Wei, Ping Luo, and Liang Lin. "Clothing co-parsing by joint image segmentation and labeling." Proceedings of the IEEE conference on computer vision and pattern recognition. 2014. (Year: 2014).*
Howard, Andrew, et al. "Searching for mobilenetv3." Proceedings of the IEEE/CVF international conference on computer vision. 2019. (Year: 2019).*
Chu, Xiangxiang, Bo Zhang, and Ruijun Xu. "MoGA: Searching Beyond MobileNetV3." arXiv preprint arXiv:1908.01314 (2019). (Year: 2019).*
Written Opinion and International Search Report for PCT Application No. PCT/US2021/017150 mailed on Apr. 23, 2021.
First Search for Chinese Application No. 202010084763.4 mailed on Aug. 31, 2023.
Gu et al., "Fenbushi Zhineng Zhizoo," Jan. 21, 2020, p. 277.
Second Office Action for Chinese Application No. 202010084763.4 mailed on Apr. 26, 2024.
Supplementary Search Report for Chinese Application No. 202010084763.4 mailed on Apr. 25, 2024.
Tian Xuan et al., "Image semantic segmentation technology based on deep learning," Dec. 31, 2019 with English machine translation.
Third Office Action for Chinese Application No. 202010084763.4 mailed on Aug. 16, 2024.
Supplementary Search Report for Chinese Application No. 202010084763.4 mailed on Aug. 14, 2024.
Xiao et al., Intelligent Information Processing and Application by Dynamic Bayesian Network, National Defense Industry Press, Sep. 30, 2019 with English machine translation.
Li et al., "Based on the characteristics of depth data obstacle image segmentation and extraction", Proceedings of the 34th Chinese Control Conference, Jul. 28-30, 2015, Hangzhou, China, Jul. 31, 2018.
Jin, "Research on key technologies of hand gesture recognition based on depth information under complex scenarios", Dissertation Submitted to Shanghai Jiao Tong University for the Degree of Master, School of Electronic Information and Electrical Engineering Jan. 2018.
Search Report for Chinese Application No. 202010084763.4 mailed on Sep. 26, 2024.
Cong et al., "Foreground detection and segmentation in RGB-D images", Oct. 27, 2019.

* cited by examiner

PRODUCT RELEASE METHOD AND IMAGE PROCESSING METHOD, APPARATUS, DEVICE, AND STORAGE MEDIUM

CROSS-REFERENCE TO RELATED APPLICATION

This application is based on and claims priority to and benefit of Chinese Patent Application No. 202010084763.4, filed with the China National Intellectual Property Administration (CNIPA) on Feb. 10, 2020. The entire content of the above-identified application is incorporated herein by reference.

TECHNICAL FIELD

This specification relates to the field of image processing technology, and in particular, to a product release method and apparatus, an image processing method and apparatus, a device, and a storage medium.

BACKGROUND

With the development of Internet technologies, people can use the Internet to obtain all kinds of goods and information without leaving homes. For example, various shopping applications (APPs) are used to purchase various products online, and live streaming APPs are used to watch live streaming online.

When users use these APPS, a lot of contents may be displayed on interfaces of the APPs. For example, pictures and videos of products may be displayed on the interfaces of the shopping APPs, and streamed videos are displayed on the interfaces of the live streaming APPs.

At present, users can only watch but cannot interact with such pictures and video images displayed on the interfaces, or there are only limited forms of interaction.

SUMMARY

Embodiments of this specification provide a product release method and apparatus, an image processing method and apparatus, a device, and a storage medium, to provide more image interaction modes and increase bonding with users.

According to a first aspect, an embodiment of this specification provides an image processing method, including: obtaining an image, wherein the image includes a foreground object; generating a first mask image corresponding to the image; setting pixels corresponding to the foreground object in the first mask image to a first grayscale value range, and setting pixels corresponding to a non-foreground object in the first mask image to a second grayscale value range; and determining an outline corresponding to the foreground object in the image according to a grayscale value difference between the foreground object and the non-foreground object.

An embodiment of this specification provides a method for processing an input image. The method comprises: obtaining an input image for processing; generating a first mask image corresponding to the input image based on a machine-learning model and determining whether the input image has a foreground object; in response to determining that the input image has the foreground object, setting pixels corresponding to the foreground object in the first mask image to a first grayscale value range, and setting pixels corresponding to one or more non-foreground objects in the first mask image to a second grayscale value range; determining an outline corresponding to the foreground object in the input image according to a grayscale value range difference between the first grayscale value range of the foreground object and the second grayscale value range of the one or more non-foreground objects in the first mask image; and sending, to a client device for display, the input image with the determined outline for interaction by a user.

In an embodiment, the machine-learning model comprises a semantic segmentation model. Generating a first mask image corresponding to the input image comprises inputting the input image into the semantic segmentation model to generate the first mask image through the semantic segmentation model.

In an embodiment, the method further comprises: obtaining a sample image and a second mask image corresponding to the sample image; and training the semantic segmentation model according to the sample image under supervision of the second mask image.

In an embodiment, obtaining a second mask image corresponding to the sample image comprises: recognizing outlines of objects comprised in the sample image; selecting an object from the objects in the sample image; determining an outline of the selected object, wherein the selected object is a foreground object in the sample image; and generating the second mask image corresponding to the sample image according to the outline of the selected object.

In an embodiments, the method further comprises: performing a same image enhancement on the sample image and the second mask image, wherein the enhanced sample image and the enhanced mask image are used for training the semantic segmentation model.

In an embodiments, the image enhancement comprises: random Gaussian blur, random flipping, random rotation, random cropping, random local deformation, random affine transformation, random motion blur, random noise addition, random color enhancement, or random highlight.

In an embodiment, the semantic segmentation model comprises an encoder including a Mobile GPU-Aware (MoGa) network model and a decoder including a Lite reduce Atrous Spatial Pyramid Pooling (LR-ASPP) segmentation head network model.

In an embodiment, generating a first mask image corresponding to the input image based on a machine-learning model and determining whether the input image has a foreground object comprise: extracting the foreground object from the input image at least by processing a plurality of convolutional layers of the MoGa network model and obtaining a plurality of dimensions of semantic vectors of the input image; generating an additional semantic vector based on the LR-ASPP segmentation head network model; and obtaining the first mask image by superimposing the additional semantic vector and at least one of the plurality of dimensions of semantic vectors.

In an embodiment, when a size of the first mask image and a size of the input image are different, the size of the first mask image is scaled to the size of the input image.

In an embodiment, when a size of the first mask image and a size of the input image are the same, the pixels corresponding to the foreground object in the first mask image and the pixels corresponding to the foreground object in the input image are the same at the same positions.

In an embodiment, the method further comprises displaying, in response to the interaction, a configuration image in the outline corresponding to the foreground object.

In an embodiment, the method further comprises: obtaining attribute information about the foreground object; and displaying the attribute information in the configuration image.

In an embodiment, the method further comprises updating the one or more non-foreground objects in the input image in response to a background replacement operation triggered by the input image.

In an embodiment, the method further comprises: obtaining attribute information about the foreground object; determining an image of a target object corresponding to the attribute information, wherein the target object is determined according to a correlation between the target object and the foreground object; and displaying the image of the target object.

In an embodiment, determining an image of a target object corresponding to the attribute information comprises: displaying images of a plurality of objects corresponding to the attribute information; and selecting the image of the target object from the images of the plurality of objects.

In an embodiment, the method further comprises cutting out the foreground object from the input image according to the grayscale value range difference.

In an embodiment, the foreground object is a product to be released. The method further comprises generating a product release image corresponding to the product, according to an outline corresponding to the product in the input image and a product release template for releasing the product through the product release image.

In an embodiment, the method further comprises generating a first image layer corresponding to the foreground object and a second image layer corresponding to the one or more non-foreground objects according to the grayscale value range difference.

According to a second aspect, an embodiment of this specification provides an image processing apparatus, including: an obtaining module, configured to obtain an image, wherein the image includes a foreground object; a generation module, configured to generate a first mask image corresponding to the image; a setting module, configured to: set pixels corresponding to the foreground object in the first mask image to a first grayscale value range, and set pixels corresponding to a non-foreground object in the first mask image to a second grayscale value range; and a determination module, configured to determine an outline corresponding to the foreground object in the image according to a grayscale value difference between the foreground object and the non-foreground object.

According to a third aspect, an embodiment of this specification provides an electronic device, including a memory and a processor, wherein the memory stores executable code, and when the executable code is executed by the processor, the processor at least implements the image processing method according to the first aspect.

An embodiment of this specification provides a system for processing an input image, comprising a processor and a non-transitory computer-readable storage medium storing instructions executable by the processor to cause the system to perform operations. The operations comprise: obtaining an input image for processing; generating a first mask image corresponding to the input image based on a machine-learning model and determining whether the input image has a foreground object; in response to determining that the input image has the foreground object, setting pixels corresponding to the foreground object in the first mask image to a first grayscale value range, and setting pixels corresponding to one or more non-foreground objects in the first mask image to a second grayscale value range; determining an outline corresponding to the foreground object in the input image according to a grayscale value range difference between the first grayscale value range of the foreground object and the second grayscale value range of the one or more non-foreground objects in the first mask image; and sending, to a client device for display, the input image with the determined outline for interaction by a user.

An embodiment of this specification provides a non-transitory machine-readable storage medium, wherein the non-transitory machine-readable storage medium stores executable code, and when the executable code is executed by a processor of an electronic device, the processor at least implements the image processing method according to the first aspect.

An embodiment of this specification provides a non-transitory computer-readable storage medium for processing an input image, configured with instructions executable by one or more processors to cause the one or more processors to perform operations. The operations comprise: obtaining an input image for processing; generating a first mask image corresponding to the input image based on a machine-learning model and determining whether the input image has a foreground object; in response to determining that the input image has the foreground object, setting pixels corresponding to the foreground object in the first mask image to a first grayscale value range, and setting pixels corresponding to one or more non-foreground objects in the first mask image to a second grayscale value range; determining an outline corresponding to the foreground object in the input image according to a grayscale value range difference between the first grayscale value range of the foreground object and the second grayscale value range of the one or more non-foreground objects in the first mask image; and sending, to a client device for display, the input image with the determined outline for interaction by a user.

According to a fourth aspect, an embodiment of this specification provides an image processing method, including: obtaining an image, wherein the image includes a foreground object; generating a mask image corresponding to the image; setting pixels corresponding to the foreground object in the mask image to a first grayscale value range, and setting pixels corresponding to a non-foreground object in the mask image to a second grayscale value range; and capturing the foreground object from the image according to a grayscale value difference between the foreground object and the non-foreground object.

According to a fifth aspect, an embodiment of this specification provides an image processing apparatus, including: an obtaining module, configured to obtain an image, wherein the image includes a foreground object; a generation module, configured to generate a mask image corresponding to the image; a setting module, configured to: set pixels corresponding to the foreground object in the mask image to a first grayscale value range, and set pixels corresponding to a non-foreground object in the mask image to a second grayscale value range; and a capture module, configured to capture the foreground object from the image according to a grayscale value difference between the foreground object and the non-foreground object.

According to a sixth aspect, an embodiment of this specification provides an electronic device, including a memory and a processor, wherein the memory stores executable code, and when the executable code is executed by the processor, the processor at least implements the image processing method according to the fourth aspect.

An embodiment of this specification provides a non-transitory machine-readable storage medium, wherein the non-transitory machine-readable storage medium stores executable code, and when the executable code is executed by a processor of an electronic device, the processor at least implements the image processing method according to the fourth aspect.

According to a seventh aspect, an embodiment of this specification provides an image processing method, including: obtaining an image, wherein the image includes a foreground object; generating a mask image corresponding to the image; setting pixels corresponding to the foreground object in the mask image to a first grayscale value range, and setting pixels corresponding to a non-foreground object in the mask image to a second grayscale value range; and generating a first image layer corresponding to the foreground object and a second image layer corresponding to the non-foreground object according to a grayscale value difference between the foreground object and the non-foreground object.

According to an eighth aspect, an embodiment of this specification provides an image processing apparatus, including: an obtaining module, configured to obtain an image, wherein the image includes a foreground object; a generation module, configured to generate a mask image corresponding to the image; a setting module, configured to: set pixels corresponding to the foreground object in the mask image to a first grayscale value range, and set pixels corresponding to a non-foreground object in the mask image to a second grayscale value range; and a layering module, configured to generate a first image layer corresponding to the foreground object and a second image layer corresponding to the non-foreground object according to a grayscale value difference between the foreground object and the non-foreground object.

According to a ninth aspect, an embodiment of this specification provides an electronic device, including a memory and a processor, wherein the memory stores executable code, and when the executable code is executed by the processor, the processor at least implements the image processing method according to the seventh aspect.

An embodiment of this specification provides a non-transitory machine-readable storage medium, wherein the non-transitory machine-readable storage medium stores executable code, and when the executable code is executed by a processor of an electronic device, the processor at least implements the image processing method according to the seventh aspect.

According to a tenth aspect, an embodiment of this specification provides a product release method, including: obtaining a first image, wherein the first image includes a product that needs to be released; generating a mask image corresponding to the first image; setting pixels corresponding to the product in the mask image to a first grayscale value range, and setting pixels corresponding to a background object in the mask image in the first image to a second grayscale value range; determining an outline corresponding to the product in the first image according to a grayscale value difference between the product and the background object; and generating a second image corresponding to the product according to the outline corresponding to the product in the first image and a product release template to release the product through the second image.

According to an eleventh aspect, an embodiment of this specification provides a product release apparatus, including: an obtaining module, configured to obtain a first image, wherein the first image includes a product that needs to be released; a generation module, configured to generate a mask image corresponding to the first image; a setting module, configured to: set pixels corresponding to the product in the mask image to a first grayscale value range, and set pixels corresponding to a background object in the mask image in the first image to a second grayscale value range; a determination module, configured to determine an outline corresponding to the product in the first image according to a grayscale value difference between the product and the background object; and a release module, configured to generate a second image corresponding to the product according to the outline corresponding to the product in the first image and a product release template to release the product through the second image.

According to a twelfth aspect, an embodiment of this specification provides an electronic device, including a memory and a processor, wherein the memory stores executable code, and when the executable code is executed by the processor, the processor at least implements the product release method according to the tenth aspect.

An embodiment of this specification provides a non-transitory machine-readable storage medium, wherein the non-transitory machine-readable storage medium stores executable code, and when the executable code is executed by a processor of an electronic device, the processor at least implements the product release method according to the tenth aspect.

In embodiments of this specification, any image may include a foreground object and one or more background objects. To support interaction between a user and the foreground object, a first mask image corresponding to the image is generated. If the image includes the foreground object, pixels corresponding to the foreground object in the first mask image are set to a first grayscale value range, and pixels corresponding to the one or more non-foreground objects in the first mask image are set to a second grayscale value range. That is, the first mask image is generated, it may be recognized whether the image includes the foreground object that allows interaction by the user, and in a case that the image includes the foreground object, the foreground object and the background object in the image may be binarized in the first mask image to obtain pixel positions corresponding to the foreground object in the image. Therefore, an outline corresponding to the foreground object in the image may be determined according to the first mask image. That is, an image region defined by the outline corresponds to the foreground object. Finally, based on a recognition result of the outline corresponding to the foreground object in the image, a plurality of types of interaction may be performed on the image for the user to interact with the foreground object. When the foregoing solution is used in a product, the product provides more image interaction modes, and its bonding with users is improved.

BRIEF DESCRIPTION OF THE DRAWINGS

To describe the technical solutions in embodiments of this specification more clearly, the following briefly describes accompanying drawings required for describing the embodiments. Apparently, the accompanying drawings in the following description illustrate some embodiments of this specification, and a person of ordinary skill in the art may still derive other drawings from these accompanying drawings without creative efforts.

DETAILED DESCRIPTION

To make the objectives, technical solutions, and advantages of the embodiments of this specification clearer, the following clearly and completely describes the technical solutions in the embodiments of this specification with reference to the accompanying drawings in the embodiments of this specification. Apparently, the described embodiments are merely some embodiments of this specification rather than all of the embodiments. All other embodiments obtained by a person of ordinary skill in the art based on the embodiments of this specification without creative efforts shall fall within the protection scope of this specification.

The terms used in the embodiments of this specification are merely for the purpose of describing specific embodiments, and do not limit this specification. The terms "a," "said," and "the" of singular forms used in the embodiments and the appended claims of this specification are also intended to include plural forms, unless otherwise specified in the context clearly. "A plurality of" generally includes at least two.

Depending on the context, for example, words "if" or "as if" used herein may be explained as "while . . . " or "when . . . " or "in response to determining" or "in response to detection." Similarly, depending on the context, phrases "if determining" or "if detecting (a stated condition or event)" may be explained as "when determining" or "in response to determining" or "when detecting (the stated condition or event)" or "in response to detection (the stated condition or event)."

In addition, the sequence of steps in the following embodiments of methods is an example for illustration purposes.

An image processing method provided in an embodiment of this specification may be performed by an electronic device. The electronic device may be a terminal device such as a personal computer (PC), a notebook computer or a smartphone or may be a server. The server may be a physical server including an independent host, may be a virtual server, or may be a cloud server.

For example, the image processing method provided in this embodiment of this specification may be applicable to application scenarios such as online shopping. An application scenario of online shopping is used as an example. In the image processing method, images and videos uploaded by sellers to introduce products may be processed. It may be understood that a video is also formed by a plurality of frames of image. Therefore, the processing of the video may be considered as the processing of the plurality of frames of image that form the video.

Figure 1:
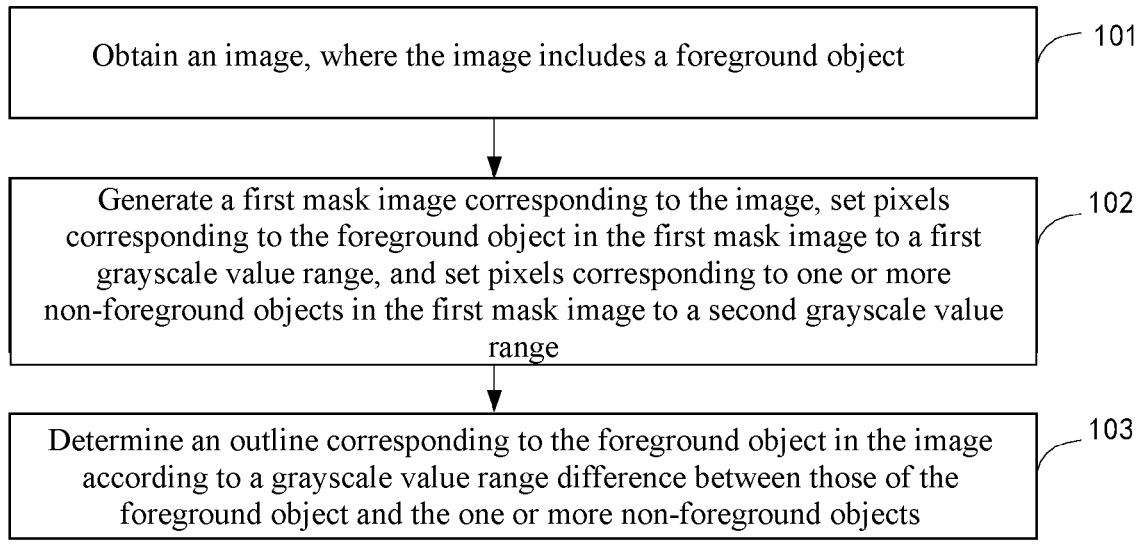
FIG. 1 is a flowchart of an image processing method, according to an embodiment of this specification.

FIG. 1 is a flowchart of an image processing method, according to an embodiment of this specification. As shown in FIG. 1, the method includes the following steps.

Step 101, Obtain an image, wherein the image includes a foreground object.

Step 102, Generate a first mask image corresponding to the image, set pixels corresponding to the foreground object in the first mask image to a first grayscale value range, and set pixels corresponding to one or more non-foreground objects in the first mask image to a second grayscale value range.

Step 103, Determine an outline corresponding to the foreground object in the image according to a grayscale value difference or a grayscale value range difference between those of the foreground object and the non-foreground objects.

An online shopping scenario is used as an example. The foregoing image may be an image uploaded by a seller for introducing a product. For example, a product of a seller is a sweater, and the seller uploads one or more pictures of a model wearing the sweater. In this case, each picture may be the foregoing image. Alternatively, the seller may upload a video. In the video, a model wearing the sweater walks in a street. In this case, each frame of images sampled from the video may be the foregoing image.

During an actual application, a user is a consumer. Assuming that the user uses a terminal device or a client device (such as a mobile phone or a computer) to search for and browse products online, if the user clicks a link address of the foregoing sweater to enter a page of details of the sweater, the image processing method provided in this embodiment may be triggered. That is, the foregoing image included in the details page is used as an input of the image processing method to perform the foregoing steps on the image.

The time for performing the image processing method is not limited thereto. For example, the image processing method may further be triggered when the seller uploads an image of a product.

The following first summarizes the core idea of the image processing method. An objective of the image processing method is to recognize whether an image includes a foreground object and to recognize an outline corresponding to the foreground object in the image. Based on a recognition result of the outline of the foreground object, the user can interact with the foreground object in the image.

For ease of description, the foregoing image is described as an input image. Whether the input image includes the foreground object and the outline corresponding to the foreground object in the input image may be determined by the first mask image generated corresponding to the input image. If it is recognized that the input image includes the foreground object, the pixels corresponding to the foreground object in the first mask image are set to the first grayscale value range, and the pixels corresponding to the non-foreground objects in the first mask image (which may be considered as the background object) are set to the second grayscale value range. If it is recognized that the input image does not include the foreground object, all pixels in the first mask image are set to the second grayscale value range.

Each of the first grayscale value range and the second grayscale value range may be a specific grayscale value or may be a grayscale value range. For example, the first grayscale value range is a grayscale value (0) corresponding to black, and the second grayscale value range is a grayscale value (255) corresponding to white. When the first grayscale value range and the second grayscale value range are value ranges, it may be considered that the input image is converted from a color picture into a grayscale picture. The first grayscale value range and the second grayscale value range can significantly distinguish between the foreground object and the non-foreground objects.

For ease of processing, when the first grayscale value range and the second grayscale value range are value ranges, an appropriate threshold may be set to convert the first mask image to a binary image in black and white. The threshold may be determined according to the first grayscale value range and the second grayscale value range, to binarize the grayscale value of the first grayscale value range to 0 and to binarize the grayscale value of the second grayscale value range to 255.

In addition, the size of the initially generated first mask image may be equal to the size of the input image or may not be equal to the size of the input image. When the sizes are not equal, the size of the first mask image may be adjusted to the size of the input image in a scaling manner.

In a case that the size of the first mask image may be equal to the size of the input image, if it is recognized that the input image includes the foreground object, the pixels corresponding to the foreground object in the first mask image and the pixels corresponding to the foreground object in the input image are the same at the same positions.

Based on this, after the binarized first mask image is obtained, if the first mask image includes two different grayscale values or two distinct grayscale value ranges, it indicates that the input image includes the foreground object. In this case, the outline corresponding to the foreground object in the input image may further be determined according to the difference between two grayscale value ranges in the first mask image.

In addition, because the pixels corresponding to the foreground object in the first mask image are set to the first grayscale value range and the pixels corresponding to the non-foreground objects in the first mask image are set to the second grayscale value range, it may be considered that pixels with grayscale values corresponding to the first grayscale value range in the first mask image correspond to the foreground object. Therefore, in an embodiment, a color rendering recommendation of the foreground object correlating a background color (that is, a color corresponding to the non-foreground objects in the input image) may further be provided in the first mask image, that is, a recommended color may be used to render the pixels corresponding to the foreground object. During an actual application, a correlations of colors may be preset to provide the foregoing recommendation based on the correlations.

For ease of description, in the following, the two binarized grayscale values are referred to as a grayscale value 1 (corresponding to black) and a grayscale value 2 (corresponding to white) respectively.

In an embodiment, the process of determining the outline corresponding to the foreground object in the input image according to the grayscale value difference between those of the foreground object and the non-foreground objects may be implemented as that, an outline of an image (corresponding to the foreground object) formed by pixels with the grayscale value 1 is extracted from the first mask image by using a set outline extraction algorithm (for example, an Open CV algorithm). In this case, a plurality of pixel positions of the pixels forming the outline are mapped to the input image to obtain the outline of the foreground object in the input image. In an embodiment, the positions of the pixels with the grayscale value 1 in the first mask image may also be determined and be located in the input image. The pixel positions in the input image are pixel positions occupied by the pixels of the foreground object in the input image. Further, an outline corresponding to the boundary of the foreground object is determined from the input image in combination with the pixel positions.

To understand more intuitively the difference between the input image and the first mask image, and the process of determining the outline of the foreground object in the input image according to the first mask image, an example is described with reference to FIG. 2.

Figure 2:
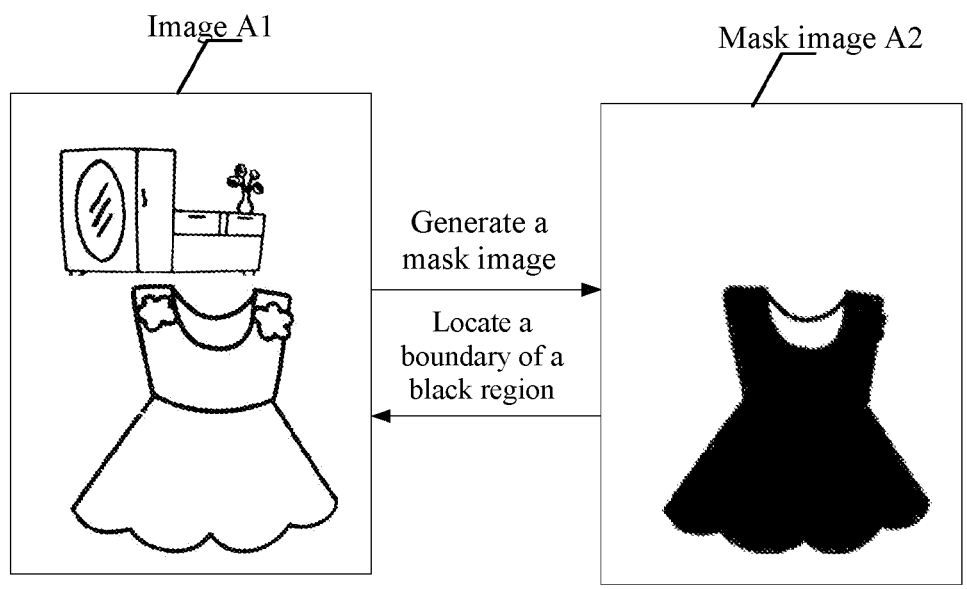
FIG. 2 is a schematic diagram of a principle of determining an outline of a foreground object in an image according to a mask image corresponding to the image, according to an embodiment of this specification.

In FIG. 2, the foregoing input image is an image A1 shown in the figure, and the first mask image is a mask image A2 shown in the figure. During the generation of the mask image A2, it is recognized that the image A1 includes a foreground object, that is, a dress. Therefore, the pixels corresponding to the foreground object in the mask image A2 are rendered in black, and other pixels are rendered in white. In this case, pixels on a boundary of a black region are the pixels forming the outline of the foreground object. The pixel positions included at the boundary of the black region are located and mapped in the image A1 to obtain the outline corresponding to the foreground object in the image A1.

FIG. 2 shows a case in which the input image includes the foreground object. A first mask image generated in the case that the input image does not include the foreground object is described below with reference to FIG. 3.

Figure 3:
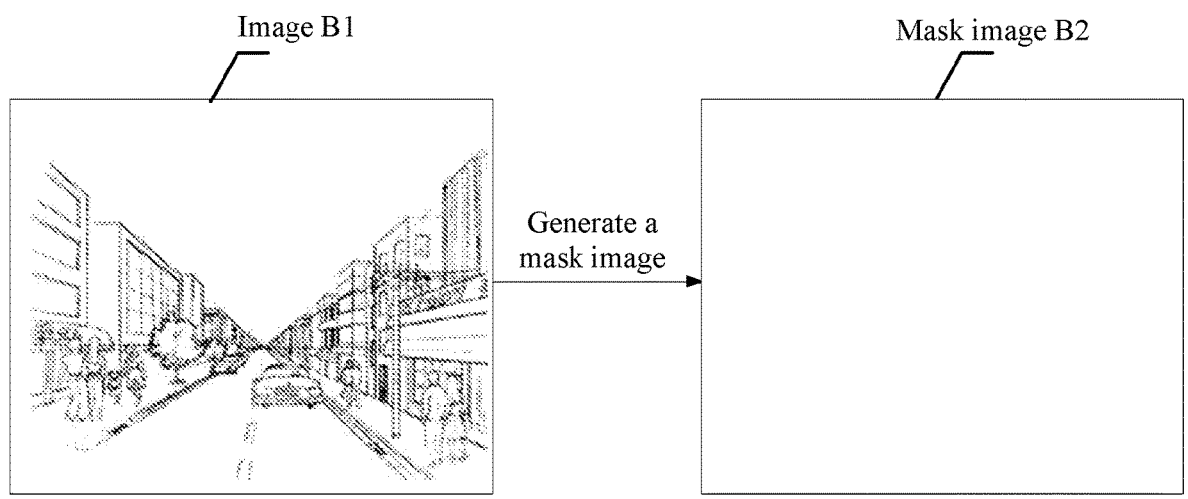
FIG. 3 is a schematic diagram of an image without a foreground object and a mask image corresponding to the image, according to an embodiment of this specification.

As shown in FIG. 3, the foregoing input image is an image B1 shown in the figure, and the first mask image is a mask image B2 shown in the figure. During the generation of the mask image B2, it is recognized that the image B1 does not include a foreground object. As shown in FIG. 3, the mask image B2 is a blank image. That is, all pixels in the image have values of the grayscale value 2, such as white. In this case, according to the mask image B2, it is found that the image B1 does not include a foreground object. Therefore, the processing of the image B1 does not trigger the execution of a subsequent interaction.

It can be learned from the foregoing descriptions that, during the generation of the first mask image, it needs to recognize whether the input image includes the foreground object.

In an embodiment, the input image may be input into a machine-learning model (e.g., a semantic segmentation model) to generate the first mask image through the semantic segmentation model. In this case, the semantic segmentation model may recognize whether the input image includes a foreground object.

That is, a semantic segmentation model may be trained in advance for the semantic segmentation model to have the capability for recognizing whether the input image includes a foreground object and the capability for generating the mask image corresponding to the input image.

The semantic segmentation model may be specifically embodied as any one of network models such as a fully convolutional network (FCN) model, a SegNet model, a DeepLab model, an efficient neural network (ENet) model, and an image cascade network (ICNet) model.

In an embodiment, when the semantic segmentation model needs to be deployed in a mobile terminal or a terminal device with a limited processing capability and storage resource, the semantic segmentation model may be formed by a Mobile GPU-Aware (MoGa) network model as an encoder and a Lite reduce Atrous Spatial Pyramid Pooling (LR-ASPP) segmentation head network model as a decoder.

Figure 4:
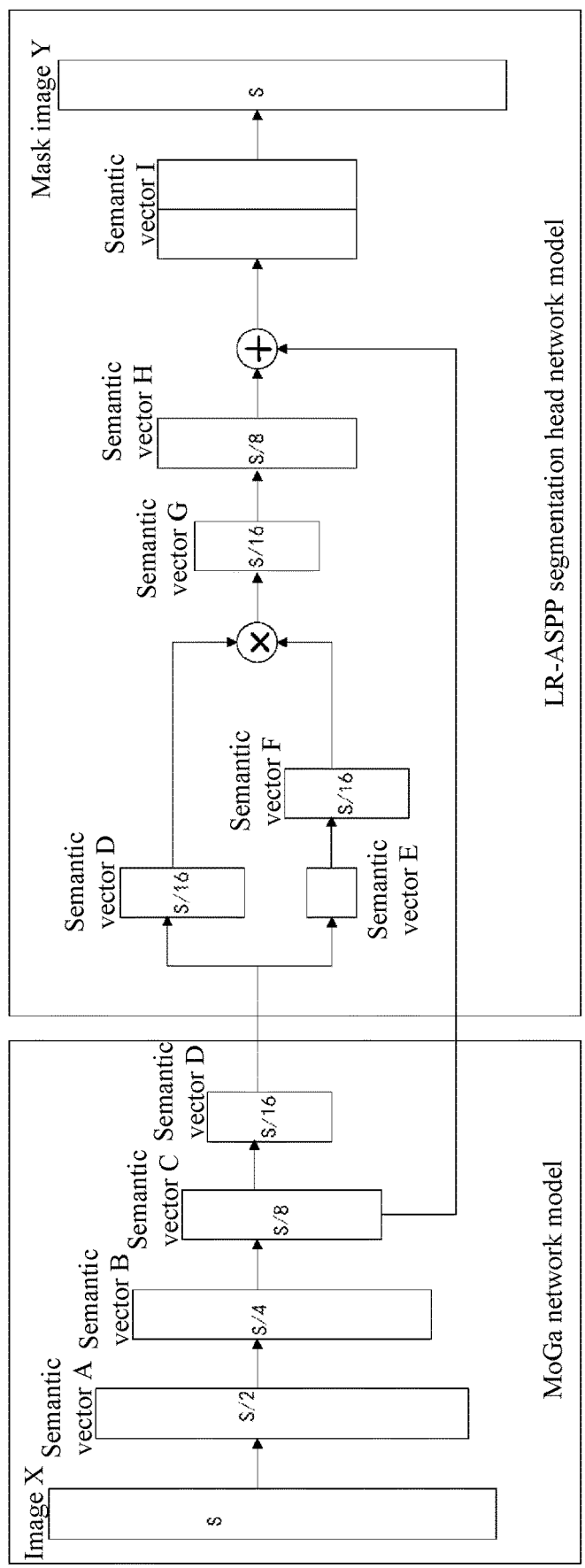
FIG. 4 is a schematic diagram of a main working principle of a semantic segmentation model, according to an embodiment of this specification.

With reference to FIG. 4, the following briefly describes a main working principle of the semantic segmentation model formed by the MoGa network model and the LR-ASPP segmentation head network model.

The input image is represented as an image X. The MoGa network model includes a plurality of convolutional layers. Different dimensions of semantic vectors may be obtained by processing each convolutional layer. For example, as shown in FIG. 4, the number of the dimensions of the image X is S, the semantic vectors with dimensions of S/2, S/4, S/8, and S/16 may be obtained respectively by processing four convolutional layers. In FIG. 4, the semantic vectors in the four dimensions are respectively represented as a semantic vector A, a semantic vector B, a semantic vector C, and a semantic vector D. It may be considered that, after the processing of each convolutional layer, the semantics of some background objects can be filtered out. Therefore, the semantics of the foreground object is gradually extracted by processing the plurality of convolutional layers.

The semantic vector D with S/16 output by the MoGa network model is input into the LR-ASPP segmentation head network model. First, the LR-ASPP segmentation head network model extracts a higher-level semantic vector, represented as a semantic vector E in FIG. 4, from the semantic vector D with a dimension of S/16. Next, the semantic vector E is up-sampled to generate a semantic vector F with a dimension of S/16. The semantic vector E may be understood as surveillance information including more accurate semantics of the foreground object. Further, the LR-ASPP segmentation head network model multiplies the semantic vector D and the semantic vector F to obtain a semantic vector G with a dimension of S/16. Compared with the semantic vector D, due to an effect of the foregoing surveillance information, the semantic vector G includes richer semantics of the foreground object. Next, the semantic vector G is up-sampled to generate a semantic vector H with the dimension of S/8 to superimpose the semantic vector H and the semantic vector C with the same dimension of S/8 to obtain a semantic vector I. The reason for superimposing with the semantic vector C is that compared with the semantic vector D with the dimension of S/16, the semantic vector C with the dimension of S/8 includes semantic information about the boundary (that is, the outline) of the foreground object. To ensure the accuracy of the recognition result of the outline of the foreground object, the semantic information about the semantic vector C with the dimension of S/8 is superimposed. Finally, a mask image Y corresponding to the image X may be obtained based on the superimposition result. A number of dimensions of the mask image Y is the same as that of the image X, such as both being S.

The above describes the process of recognizing, based on the semantic segmentation model, whether the input image includes the foreground object and generating the first mask image. A training process of the semantic segmentation model is described in the following.

In an embodiment, the following manner may be used to recognize whether the input image includes the foreground object and generate the first mask image. Depth information of the pixels in the input image is obtained. A plurality of pixel groups are separated according to the depth information of the pixels. Pixels in each pixel group have the same depth information or a difference between depth information of pixels in each pixel group is less than a set threshold. A target pixel group with minimum depth information is sorted out. If the difference between the depth information corresponding to the target pixel group and the depth information corresponding to each of other pixel groups is greater than the set threshold and the size corresponding to the target pixel group is greater than the size corresponding to each of the other pixel groups, it is determined that the input image includes the foreground object. Further, the first mask image is generated according to positions of pixels included in the target pixel group. In the first mask image, the pixel positions corresponding to the pixels included in the target pixel group are rendered with the grayscale value 1, and other pixel positions are rendered with the grayscale value 2.

After the outline corresponding to the foreground object in the input image is determined according to the grayscale value difference between those of the foreground object and the non-foreground objects in the first mask image, in an embodiment, interaction may be performed on the input image according to the outline corresponding to the foreground object. In an embodiment, the outline may be displayed to a user on a client device.

Figure 5:
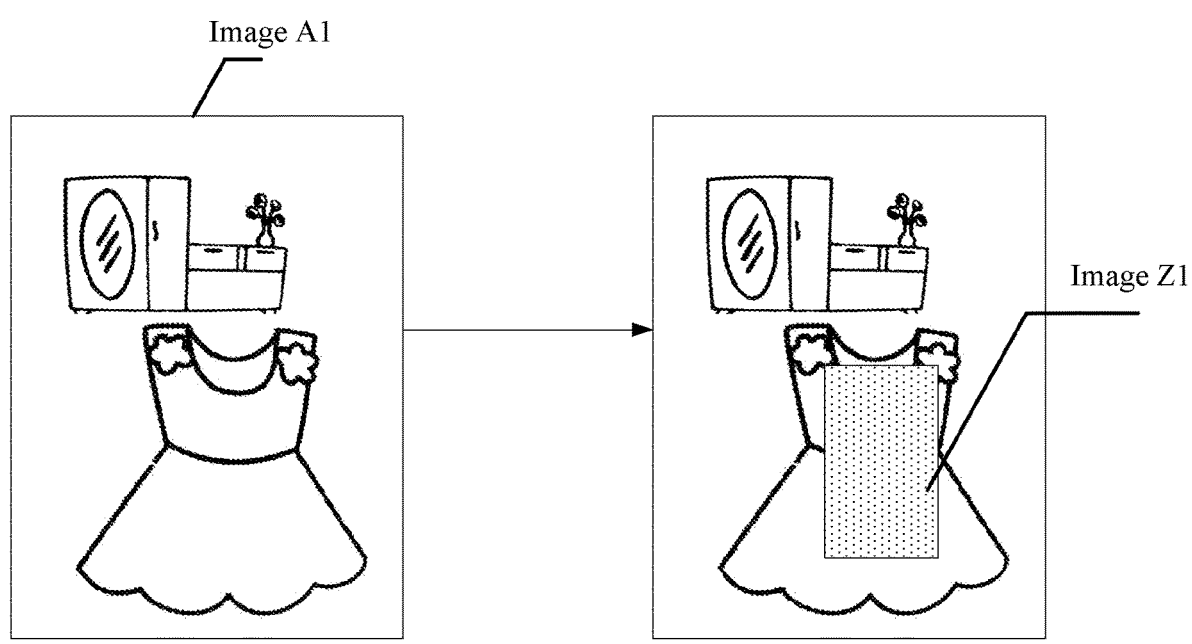
FIG. 5 is a schematic diagram illustrating an interface change of an image interaction mode, according to an embodiment of this specification.
Figure 7:
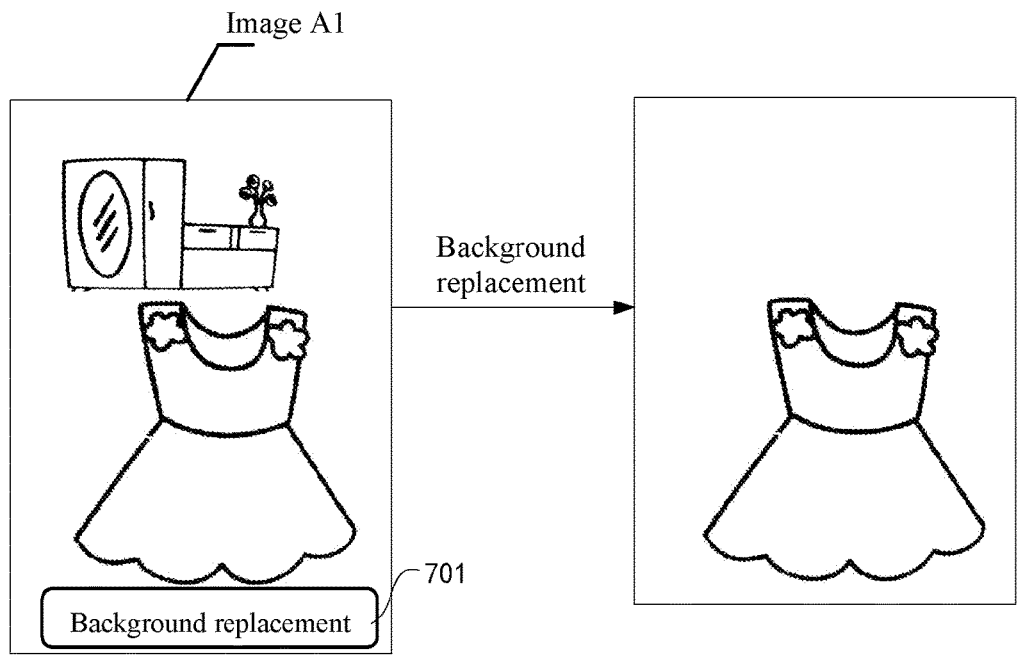
FIG. 7 is a schematic diagram illustrating an interface change of another image interaction mode, according to an embodiment of this specification.
Figure 8:
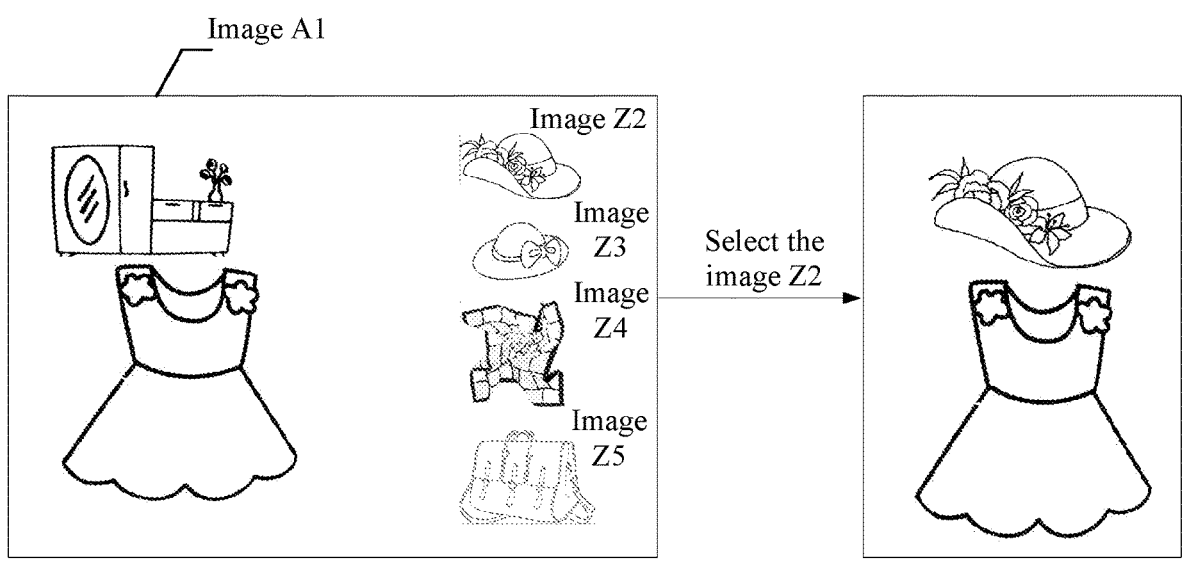
FIG. 8 is a schematic diagram illustrating an interface change of still another image interaction mode, according to an embodiment of this specification.

Generally, the interaction may directly change a display effect of the input image or may display some interactive elements for users to use. Therefore, the users change the display effect of the input image according to their own requirements. With reference to FIG. 5, FIG. 7, and FIG. 8, the following provides several optional interaction modes.

FIG. 5 is a schematic diagram of an interface change of an image interaction mode, according to an embodiment of this specification. In FIG. 5, the input image is the image A1 in the example above, and the foreground object is a dress. In this case, in an embodiment, the interaction on the image A1 may be displaying a configuration image in the outline corresponding to the foreground object, for example, an image Z1 shown in FIG. 5. During an actual application, an effect of the image Z1 may be prompting the users to focus on an object in the image A1.

In addition, in some application scenarios, in some embodiments, the attribute information about the foreground object may further be obtained. Therefore, the attribute information is displayed along with the configuration image.

Figure 6:
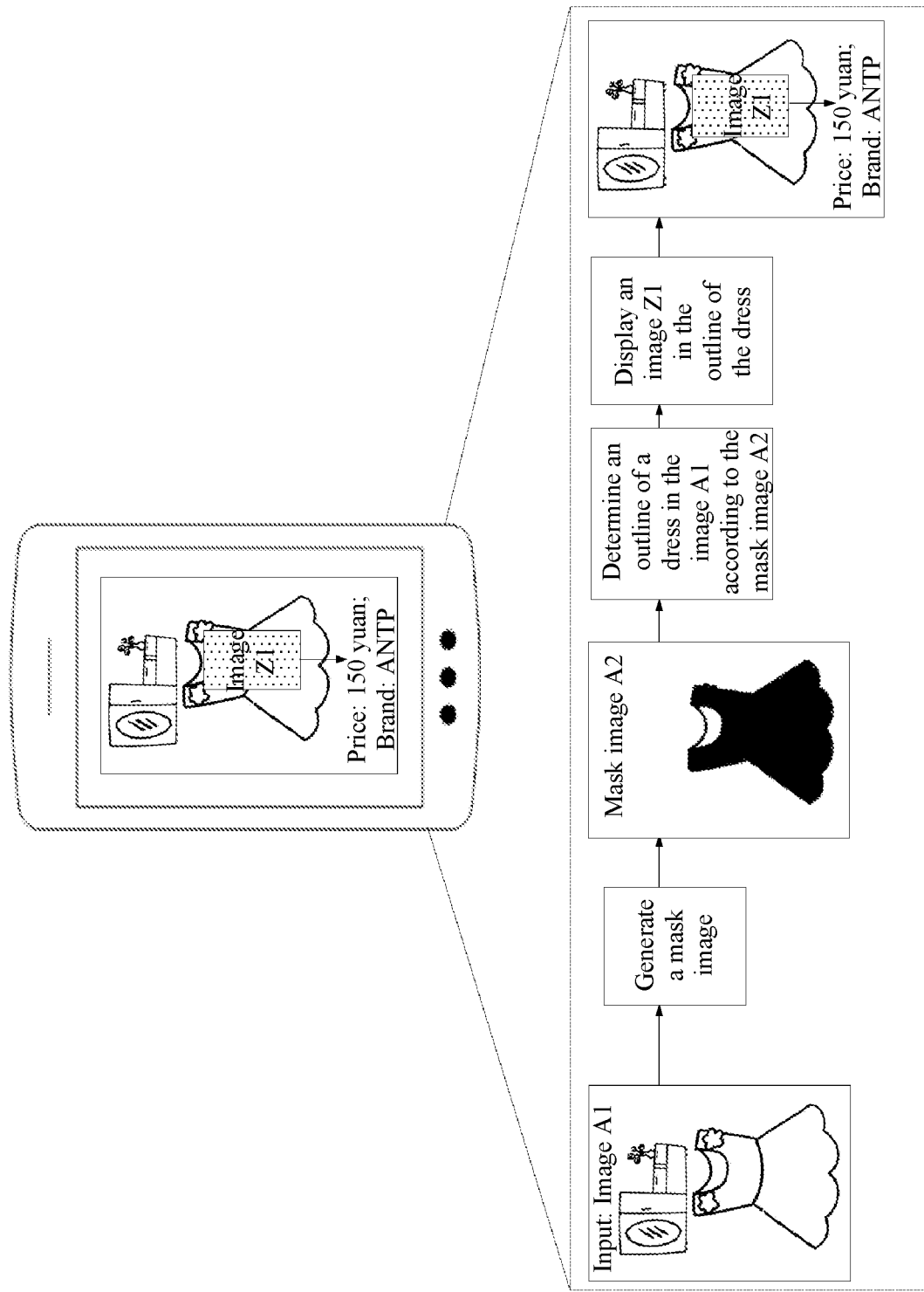
FIG. 6 is a schematic diagram of an application scenario of an image processing method, according to an embodiment of this specification.

For ease of understanding, an online shopping scenario is used as an example for description with reference to FIG. 6.

A user currently browses the foregoing image A1 in a product interface. The mask image A2 corresponding to the image A1 is generated. The image A1 including the foreground object, that is, a dress, may be known based on the mask image A2. Further, the outline corresponding to the dress in the image A1 may be determined based on the mask image A2. Since the foreground object is the dress, in order for a user to clearly learn about the attribute information such as price, brand, and thickness of the dress upon seeing the image, based on a recognition result of the outline of the dress, the image Z1 shown in FIG. 6 may be displayed in the range of the outline of the dress for the user to know to focus on the dress. Moreover, the attribute information of the dress, for example the price of 150 yuan and the brand of ANTP, are displayed along with the image Z1. In this case, the user does not need to check other positions with the introduction of the foregoing attribute information in the interface to learn about the information.

FIG. 7 is a schematic diagram of an interface change of another image interaction mode, according to an embodiment of this specification. In FIG. 7, the input image is the image A1 in the example above, and the foreground object is a dress. In an embodiment, the interaction on the image A1 may be updating the non-foreground objects (that is, the background objects) in the image A1 in response to a background replacement operation triggered by the image A1. In the interaction mode, a control used for triggering the background replacement operation may be displayed in the image A1, for example, the background replacement button 701 shown in FIG. 7. In an embodiment, some optional background materials for selection may also be provided.

An online shopping scenario is still used as an example. Since an original background in the image A1 may provide the foreground object a specific visual effect, when a user wants to see visual effects for the foreground object with background patterns of different styles and brightness during shopping, the foregoing interaction mode may be used for replacing background objects.

FIG. 8 is a schematic diagram of an interface change of still another image interaction mode, according to an embodiment of this specification. In FIG. 8, the input image is the image A1 in the example above, and the foreground object is a dress. In an embodiment, the interaction on the image A1 may be obtaining attribute information about the foreground object, determining images of target objects corresponding to the attribute information, and displaying the images of the target objects along with the foreground object. The target objects and the foreground object have correlations. In an embodiment, the foregoing attribute information includes at least one of the type information and color information.

For example, as shown in FIG. 8, the type information of the dress as the foreground object in the image A1 is a dress, and the color information is white. In addition, a plurality of preset objects having correlations with the dress include a sun hat, a scarf, and a bag. As shown in FIG. 8, images corresponding to the plurality of objects may be displayed in association with the image A1. An image Z2, an image Z3, an image Z4, and an image Z5 that are shown in FIG. 8 may be images of some products selected from a database. Further, the image of a target object may be determined according to a selection operation by the user on the images of the plurality of objects selected from the database. Assuming that the image of the selected target object is the image Z2, the image Z2 of the target object may be displayed in association with the foreground object, that is, a dress. In FIG. 8, the display correlation is that displaying the sun hat of the image Z2 on the head of the model wearing the dress in the image A1.

In addition to the image processing method provided above, in an embodiment, another image processing method is further provided herein, including the following steps: obtaining an image, wherein the image includes a foreground object; generating a mask image corresponding to the image; setting pixels corresponding to the foreground object in the mask image to a first grayscale value range, and setting pixels corresponding to one or more non-foreground objects in the mask image to a second grayscale value range; and cutting out the foreground object from the image according to a grayscale value difference between those of the foreground object and the non-foreground objects.

Based on the image processing method, cutout may be implemented on the image. Specifically, the foreground object is cut out from the image.

The cutting out the foreground object from the image according to a grayscale value difference between those of the foreground object and the non-foreground objects may be specified, such that the outline corresponding to the foreground object in the image is first determined according to the grayscale value difference between those of the foreground object and the non-foreground objects and the foreground object is then cut out from the image based on the outline.

In the foregoing image processing method, for the process of generating the mask image and determining the outline of the foreground object, reference may be made to the related descriptions of the embodiments described above, which is not repeated herein.

In addition, in an embodiment, another image processing method is further provided herein, including the following steps: obtaining an image, wherein the image includes a foreground object; generating a mask image corresponding to the image; setting pixels corresponding to the foreground object in the mask image to a first grayscale value range, and setting pixels corresponding to one or more non-foreground objects in the mask image to a second grayscale value range; and generating a first image layer corresponding to the foreground object and a second image layer corresponding to the non-foreground objects according to a grayscale value difference between those of the foreground object and the non-foreground objects.

Based on the image processing method, layer processing may be implemented on the image. Specifically, the first image layer corresponding to the foreground object in the image and the second image layer corresponding to the non-foreground objects in the image are generated.

The generating a first image layer corresponding to the foreground object and a second image layer corresponding to the non-foreground objects according to a grayscale value difference between those of the foreground object and the non-foreground objects may be specified, such that the outline corresponding to the foreground object in the image is first determined according to the grayscale value difference between those of the foreground object and the non-foreground objects, and the foreground object is then cutout from the image based on the outline to generate the first image layer including the foreground object. The first image layer is also an image, and the size of the first image layer may be equal to the size of the foregoing image including the foreground object and the non-foreground objects. The second image layer may be an image obtained by cutting out the foreground object on the image. Based on the segmentation of the first image layer and the second image layer, a user may interact with the first image layer or the second image layer as required.

In the foregoing image processing method, for the process of generating the mask image, reference may be made to the related descriptions of other embodiments above, which are not repeated herein.

In addition, in another embodiment, a product release method is further provided herein, including the following steps: obtaining a first image, wherein the first image includes a product that needs to be released; generating a mask image corresponding to the first image; setting pixels corresponding to the product in the mask image to a first grayscale value range, and setting pixels corresponding to one or more background objects in the mask image in the first image to a second grayscale value range; determining an outline corresponding to the product in the first image according to a grayscale value difference between those of the product and the background object; and generating a second image corresponding to the product according to the outline corresponding to the product in the first image and a product release template to release the product through the second image.

To make it convenient for a seller to release a product image with adequate visual effects, an online shopping platform provides various product release templates for selection by the seller. For example, for a product such as a women's top, a product release template is a video or an image of a model wearing the product and walking in a street. In addition, in this embodiment, assuming that a product that a seller needs to release is a sweater, when the seller releases the sweater, an image including the sweater may be taken as the foregoing first image. For example, the sweater is spread on a table for imaging. Based on this, the foreground object in the foregoing mask image is the sweater, and the background object is the table.

The generating a second image corresponding to the product according to the outline corresponding to the product in the first image and a product release template may be specified, such that an image region corresponding to the product is cut out from the first image according to the outline corresponding to the product in the first image. Further, assuming that a product release template selected by the seller is the product release template in the foregoing example, the cutout image region may be transformed accordingly to add the transformed image to a corresponding position on the product release template. Therefore, the foregoing second image that needs to be released is obtained, and the second image is displayed on a product display interface.

The following describes the training process of the semantic segmentation model mentioned above.

Figure 9:
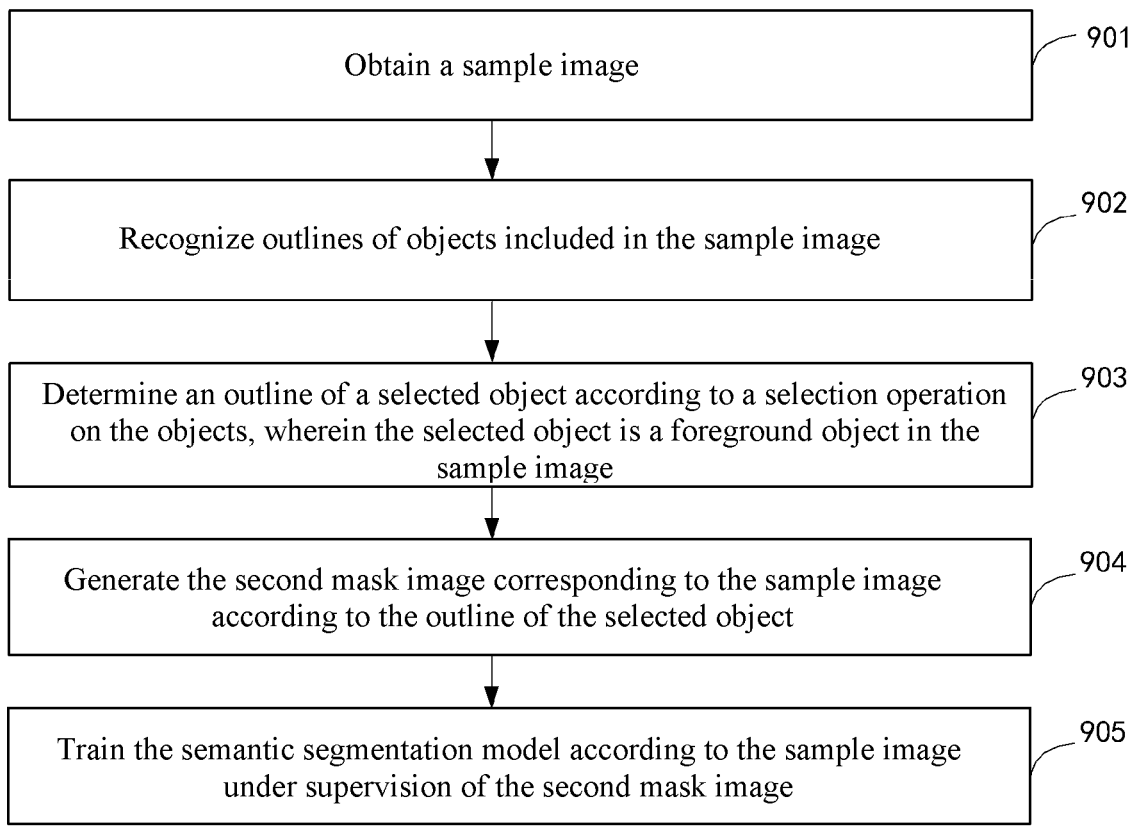
FIG. 9 is a flowchart of a training process of a semantic segmentation model, according to an embodiment of this specification.

FIG. 9 is a flowchart of a training process of a semantic segmentation model, according to an embodiment of this specification. As shown in FIG. 9, the training process may include the following steps.

Step 901, Obtain a sample image.

Step 902, Recognize outlines of objects included in the sample image.

Step 903, Determine an outline of a selected object according to a selection operation on the objects, wherein the selected object is a foreground object in the sample image.

Step 904, Generate the second mask image corresponding to the sample image according to the outline of the selected object.

Step 905, Train the semantic segmentation model according to the sample image under supervision of the second mask image.

During the training of the semantic segmentation model, a large quantity of training samples need to be collected, including positive sample images and negative sample images. The positive sample image is an image including a foreground object, and the negative sample image is an image including no foreground object.

In this embodiment, the semantic segmentation model is trained in a supervised training manner. Supervision information is a mask image of each sample image of the training samples.

It may be understood that, because a negative sample image does not include a foreground object, a mask image corresponding to the negative sample image is an image with all pixels having the grayscale value 2, that is, a white image. In the mask image corresponding to the positive sample image, values of the pixels corresponding to the foreground object are set to the grayscale value 1 (black), and values of other pixels corresponding to the non-foreground objects are set to the grayscale value 2 (white).

Before training, it is necessary to first generate a corresponding mask image as the supervision information for the positive sample image.

Assuming that the foregoing sample image is any one of the positive sample images, and using the sample image as an example, the process of generating the second mask image corresponding to the sample image may be as follows.

First, the outline of each object included in the sample image may be recognized through OpenCV or other outline extraction algorithms. That is, the sample image includes a plurality of objects including the foreground object and one or more background objects. In this case, the outlines corresponding to all the objects included in the sample image are extracted. Further, an outline extraction result of each object may be displayed on an interface for the person in charge of model training to see the outline of each object. Based on this, the person may select the foreground object (for example, triggering a click operation in a region enclosed by the outline corresponding to the foreground object). In this case, based on the outline of the selected foreground object, the second mask image corresponding to the sample image may be generated. That is, values of the pixels in the region enclosed by the outline of the selected foreground object are set to the grayscale value 1, and values of other pixels corresponding to the unselected objects are set to the grayscale value 2, to obtain the second mask image.

After the second mask image corresponding to the sample image is obtained, under supervision of the second mask image, the sample image is input into the semantic segmentation model to perform the supervised training on the semantic segmentation model.

In another embodiment, to improve the efficiency of model training and the diversity of training samples, extension processing may further be performed on the collected training samples.

Using the foregoing sample image as an example, the extension processing comprises: performing a same image enhancement on the sample image and the second mask image; and training the semantic segmentation model by using the enhanced sample image and the enhanced mask image.

In an embodiment, the foregoing image enhancement includes, but not limited to, any one of the following: random Gaussian blur, random flipping, random rotation, random cropping, random local deformation, random affine transformation, random motion blur, random noise addition, random color enhancement, and random highlight.

Figure 10:
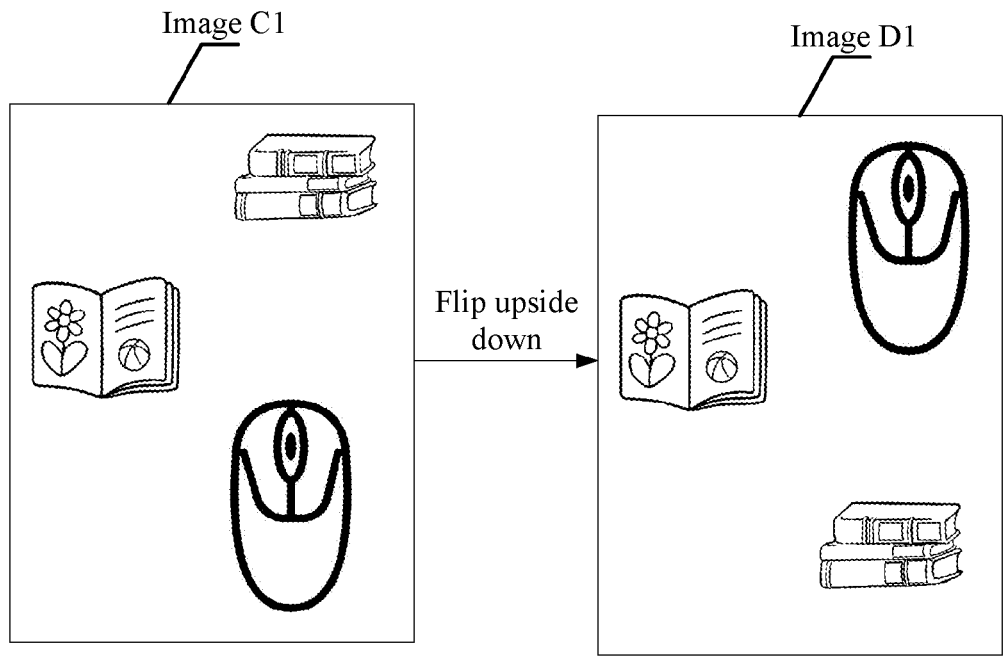
FIG. 10 is a schematic diagram illustrating an effect of an image enhancement mode, according to an embodiment of this specification.
Figure 11:
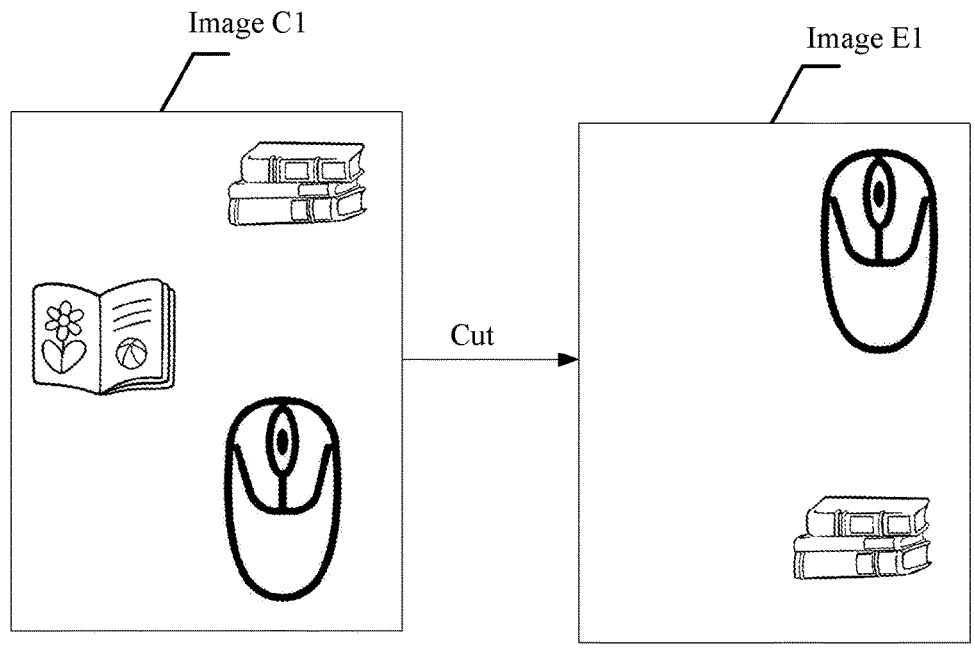
FIG. 11 is a schematic diagram illustrating an effect of another image enhancement mode, according to an embodiment of this specification.

The following describes the effects of two of the foregoing image enhancement modes with reference to FIG. 10 and FIG. 11.

In FIG. 10, a sample image is an image C1, and the foreground object in the image C1 is a mouse shown in the figure. The image C1 is transformed into an image D1 through a flipping transformation. In the image D1, the position of the mouse is changed as compared with that in the image C1.

It may be understood that the flipping transformation is also performed on the mask image corresponding to the image C1 to obtain the mask image corresponding to the image D1 from the mask image corresponding to the image C1.

Based on this, another training sample, such as the image D1, may be extended through the collected training samples, such as the image C1. More training samples may be extended from the image C1 by changing the specific flipping form of the flipping transformation.

In FIG. 11, the sample image is still the image C1. The image C1 is transformed into an image E1 in a cropping manner. In the image E1, the part of the picture book is eliminated.

The cropping operation is also performed on the mask image corresponding to the image C1 to obtain the mask image corresponding to the image E1 from the mask image corresponding to the image C1. Based on this, another training sample, such as the image E1, may be extended through the collected training sample, such as the image C1. More training samples may be extended from the image C1 by changing the cropping position and the cropping window size.

An image processing apparatus of one or more embodiments of this specification is described below in detail. It may be understood by a person skilled in the art that the image processing apparatus may be configured by using commercially available hardware components through steps in this solution.

Figure 12:
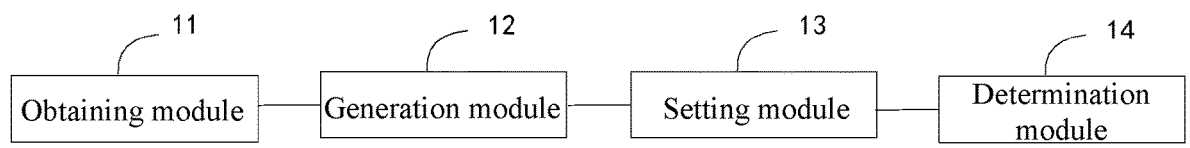
FIG. 12 is a schematic structural diagram of an image processing apparatus, according to an embodiment of this specification.

FIG. 12 is a schematic structural diagram of an image processing apparatus, according to an embodiment of this specification. As shown in FIG. 12, the apparatus includes an obtaining module 11, a generation module 12, a setting module 13, and a determination module 14.

The obtaining module 11 is configured to obtain an image, wherein the image includes a foreground object.

The generation module 12 is configured to generate a first mask image corresponding to the image.

The setting module 13 is configured to: set pixels corresponding to the foreground object in the first mask image to a first grayscale value range, and set pixels corresponding to one or more non-foreground objects in the first mask image to a second grayscale value range.

The determination module 14 is configured to determine an outline corresponding to the foreground object in the image according to a grayscale value difference between those of the foreground object and the non-foreground objects.

In an embodiment, the generation module 12 may be specifically configured to input the image into a semantic segmentation model to generate the first mask image through the semantic segmentation model.

In an embodiment, the semantic segmentation model is formed by a MoGa network model as an encoder and an LR-ASPP segmentation head network model as a decoder.

In an embodiment, the apparatus further includes a model training module.

The model training module is configured to: obtain a sample image and a second mask image corresponding to the sample image; and train the semantic segmentation model according to the sample image under supervision of the second mask image.

In an embodiment, in the process of obtaining the second mask image corresponding to the sample image, the model training module is specifically configured to: recognize outlines of objects included in the sample image; determine an outline of a selected object according to a selection operation on the objects, wherein the selected object is a foreground object in the sample image; and generate the second mask image corresponding to the sample image according to the outline of the selected object.

In an embodiment, the model training module is further configured to: perform the same image enhancement on the sample image and the second mask image, wherein the enhanced sample image and the enhanced mask image is used for training the semantic segmentation model.

In an embodiment, the image enhancement includes any one of the following: random Gaussian blur, random flipping, random rotation, random cropping, random local deformation, random affine transformation, random motion blur, random noise addition, random color enhancement, and random highlight.

In an embodiment, the apparatus may further include a display module configured to display the outline corresponding to the foreground object.

In an embodiment, the apparatus may further include an interaction module configured to interact with the image according to the outline corresponding to the foreground object.

In an embodiment, the interaction module may be specifically configured to: display a configuration image in the outline corresponding to the foreground object.

In an embodiment, the interaction module may further be configured to: obtain attribute information about the foreground object; and display the attribute information in the configuration image.

In an embodiment, the interaction module may further be configured to update the non-foreground objects in the first image in response to a background replacement operation triggered by the first image.

In an embodiment, the interaction module may further be configured to: obtain attribute information about the foreground object; determine an image of a target object corresponding to the attribute information, wherein the target object and the foreground object have a correlations; and display the image of the target object correlating with the foreground object.

In an embodiment, the interaction module may further be configured to: display images of a plurality of objects corresponding to the attribute information; and determine the image of the target object according to a selection operation on the images of the plurality of objects.

In an embodiment, the attribute information includes at least one of the following: type information and color information.

The apparatus shown in FIG. 12 may perform the image processing method provided in the foregoing embodiments of FIG. 1 to FIG. 11. For the detailed execution process and technical effects, reference may be made to descriptions in the foregoing embodiments, and details are not described herein again.

Figure 13:
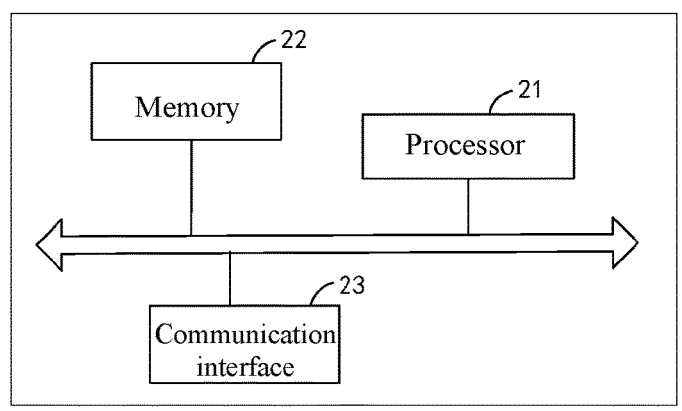
FIG. 13 is a schematic structural diagram of an electronic device corresponding to the image processing apparatus according to the embodiment shown in FIG. 12.

In a possible design, the structure of the foregoing image processing apparatus shown in FIG. 12 may be embodied as an electronic device. As shown in FIG. 13, the electronic device may include a processor 21 and a memory 22. The memory 22 stores computer executable code. When the computer executable code is executed by the processor 21, the processor 21 at least implements the image processing method provided in the foregoing embodiments of FIG. 1 to FIG. 11.

In an embodiment, the electronic device may further include a communication interface 23 configured to communicate with other devices.

In addition, an embodiment of this specification provides a non-transitory machine-readable storage medium, wherein the non-transitory machine-readable storage medium stores executable code of instructions, and when the executable code is executed by the processor of an electronic device, the processor at least implements the image processing method provided in the foregoing embodiments of FIG. 1 to FIG. 11.

The apparatus embodiment described above is merely exemplary. The units described as separate parts may or may not be physically separated. Some or all of the modules may be selected according to actual needs to achieve the objectives of the solutions of the embodiments. A person of ordinary skill in the art may understand and implement the solutions without creative efforts.

Through the description of the foregoing embodiments, a person skilled in the art may clearly understand that the embodiments may be implemented by a necessary universal hardware platform, or by a combination of hardware and software. Based on such an understanding, the foregoing technical solutions essentially or the part contributing to existing technologies may be implemented in a form of a computer product. This specification may use a form of a computer program product that is implemented on one or more computer-readable storage media (including but not limited to a disk memory, a compact disc read-only memory (CD-ROM), an optical memory, and the like) that include computer-executable program code.

An image processing method provided in an embodiment of this specification may be performed by a program/a piece of software, and the program/software may be provided by a network side. The electronic device provided in the foregoing embodiment may download the program/software to a local nonvolatile storage medium. When the foregoing image processing method needs to be performed, the program/software is read into an internal memory through a CPU. The CPU executes the program/software to implement the image processing method provided in the foregoing embodiment. For the execution process, reference may be made to the description in FIG. 1 to FIG. 11.

Finally, it should be noted that the foregoing embodiments merely describe the technical solutions of this specification and are not intended to be limiting. Although this specification is described in detail with reference to the foregoing embodiments, a person of ordinary skill in the art should understand that modifications may still be made to the technical solutions described in the foregoing embodiments or equivalent replacements may still be made to some technical features thereof, without departing from the spirit and scope of the technical solutions of the embodiments of this specification.

What is claimed is:

1. A method for processing an input image, comprising:
   obtaining an input image for processing;
   generating a first mask image corresponding to the input image based on a machine-learning model and determining whether the input image has a foreground object, wherein
   the foreground object comprises a product,
   the machine-learning model is trained using supervision information from a plurality of positive sample images and a plurality of negative sample images, each positive sample image comprises a foreground object and each negative sample image includes no foreground object, and the supervision information comprises mask images of the plurality of positive sample images and the plurality of negative sample images, wherein pixel values of a mask image for each positive sample image have different grayscale values than pixel values of a mask image for each negative sample image, and
   the determining whether the input image has the foreground object comprises:
      obtaining a plurality of pixel groups by separating pixels of the input image according to depth information of the pixels; and
      determining that the input image has the foreground object in response to that (1) a difference between the depth information of a target pixel group and the depth information of other pixel groups is greater than a set threshold, and (2) a size corresponding to the target pixel group is greater than the size corresponding to the other pixel groups;
   in response to determining that the input image has the foreground object, setting pixels corresponding to the foreground object in the first mask image to a first grayscale value range, and setting pixels corresponding to one or more non-foreground objects in the first mask image to a second grayscale value range;
   determining an outline corresponding to the foreground object in the input image according to a grayscale value range difference between the first grayscale value range of the foreground object and the second grayscale value range of the one or more non-foreground objects in the first mask image;
   obtaining images of a plurality of items related to the foreground object;
   displaying the images of the plurality of items related to the foreground object;
   identifying one or more user-selected images from the displayed images of the plurality of items related to the foreground object;
   generating a product release image corresponding to the product, wherein the product release image comprises both (1) the foreground object cut out from the input image according to the determined outline and (2) the one or more user-selected images.

2. The method according to claim 1, wherein:
   the machine-learning model comprises a semantic segmentation model; and
   the generating a first mask image corresponding to the input image comprises inputting the input image into the semantic segmentation model to generate the first mask image through the semantic segmentation model.

3. The method according to claim 2, further comprising:
   training the semantic segmentation model using the supervision information from the plurality of positive sample images and the plurality of negative sample images.

4. The method according to claim 3, further comprising:
   performing image enhancement on the plurality of positive sample images, the plurality of negative sample images, and the supervision information to diversify training data.

5. The method according to claim 4, wherein the image enhancement comprises: random Gaussian blur, random flipping, random rotation, random cropping, random local deformation, random affine transformation, random motion blur, random noise addition, random color enhancement, or random highlight.

6. The method according to claim 2, wherein the semantic segmentation model comprises an encoder including a Mobile GPU-Aware (MoGa) network model and a decoder including a Lite reduce Atrous Spatial Pyramid Pooling (LR-ASPP) segmentation head network model.

7. The method according to claim 6, wherein generating a first mask image corresponding to the input image based on a machine-learning model and determining whether the input image has a foreground object comprise:
   extracting the foreground object from the input image at least by processing a plurality of convolutional layers of the MoGa network model and obtaining a plurality of dimensions of semantic vectors of the input image;
   obtaining a first semantic vector from a last convolution layer of the MoGa network, and extracting a higher-level semantic vector based on the first semantic vector, wherein the higher-level semantic vector comprises surveillance information including semantics of the foreground object;
   upsampling the higher-level semantic vector such that the up-sampled higher-level semantic vector and the first semantic vector have a same dimension;
   multiplying the up-sampled higher-level semantic vector and the first semantic vector to generate an additional semantic vector based on the LR-ASPP segmentation head network model; and
   obtaining the first mask image by superimposing the additional semantic vector and at least one of the plurality of dimensions of semantic vectors.

8. The method according to claim 1, wherein when a size of the first mask image and a size of the input image are different, the size of the first mask image is scaled to the size of the input image.

9. The method according to claim 1, wherein when a size of the first mask image and a size of the input image are the same, the pixels corresponding to the foreground object in the first mask image and the pixels corresponding to the foreground object in the input image are the same at the same positions.

10. The method according to claim 1, further comprising:
    sending, to a client device for display, the input image with the determined outline for interaction by a user; and
    displaying, in response to the interaction, a configuration image within the determined outline corresponding to the foreground object.

11. The method according to claim 10, further comprising:
    obtaining attribute information about the foreground object; and
    displaying the attribute information in the configuration image, wherein the attribute information comprises at least one of a price or a brand of the foreground object.

12. The method according to claim 1, further comprising:
    updating the one or more non-foreground objects in the input image in response to a background replacement operation triggered on the input image.

13. The method according to claim 1, further comprising:
    generating a first image layer corresponding to the foreground object and a second image layer corresponding to the one or more non-foreground objects according to the grayscale value range difference.

14. A system for processing an input image, comprising a processor and a non-transitory computer-readable storage medium storing instructions executable by the processor to cause the system to perform operations comprising:
    obtaining an input image for processing;
    generating a first mask image corresponding to the input image based on a machine-learning model and determining whether the input image has a foreground object, wherein
    the foreground object comprises a product,
    the machine-learning model is trained using supervision information from a plurality of positive sample images and a plurality of negative sample images, each positive sample image comprises a foreground object and each negative sample image includes no foreground object, and the supervision information comprises mask images of the plurality of positive sample images and the plurality of negative sample images, wherein pixel values of a mask image for each positive sample image have different grayscale values than pixel values of a mask image for each negative sample image, and
    the determining whether the input image has the foreground object comprises:
      obtaining a plurality of pixel groups by separating pixels of the input image according to depth information of the pixels; and
      determining that the input image has the foreground object in response to that (1) a difference between the depth information of a target pixel group and the depth information of other pixel groups is greater than a set threshold, and (2) a size corresponding to the target pixel group is greater than the size corresponding to the other pixel groups;
    in response to determining that the input image has the foreground object, setting pixels corresponding to the foreground object in the first mask image to a first grayscale value range, and setting pixels corresponding to one or more non-foreground objects in the first mask image to a second grayscale value range;
    determining an outline corresponding to the foreground object in the input image according to a grayscale value range difference between the first grayscale value range of the foreground object and the second grayscale value range of the one or more non-foreground objects in the first mask image;
    obtaining images of a plurality of items related to the foreground object;
    displaying the images of the plurality of items related to the foreground object;
    identifying one or more user-selected images from the displayed images of the plurality of items related to the foreground object;
    generating a product release image corresponding to the product, wherein the product release image comprises both (1) the foreground object cut out from the input image according to the determined outline and (2) the one or more user-selected images.

15. A non-transitory computer-readable storage medium for processing an input image, configured with instructions executable by one or more processors to cause the one or more processors to perform operations comprising:
    obtaining an input image for processing;
    generating a first mask image corresponding to the input image based on a machine-learning model and determining whether the input image has a foreground object, wherein
    the foreground object comprises a product,
    the machine-learning model is trained using supervision information from a plurality of positive sample images and a plurality of negative sample images, each positive sample image comprises a foreground object and each negative sample image includes no foreground object, and the supervision information comprises mask images of the plurality of positive sample images and the plurality of negative sample images, wherein pixel values of a mask image for each positive sample image have different grayscale values than pixel values of a mask image for each negative sample image, and the determining whether the input image has the foreground object comprises:
  obtaining a plurality of pixel groups by separating pixels of the input image according to depth information of the pixels; and
  determining that the input image has the foreground object in response to that (1) a difference between the depth information of a target pixel group and the depth information of other pixel groups is greater than a set threshold, and (2) a size corresponding to the target pixel group is greater than the size corresponding to the other pixel groups;
in response to determining that the input image has the foreground object, setting pixels corresponding to the foreground object in the first mask image to a first grayscale value range, and setting pixels corresponding to one or more non-foreground objects in the first mask image to a second grayscale value range;

determining an outline corresponding to the foreground object in the input image according to a grayscale value range difference between the first grayscale value range of the foreground object and the second grayscale value range of the one or more non-foreground objects in the first mask image;

obtaining images of a plurality of items related to the foreground object;

displaying the images of the plurality of items related to the foreground object;

identifying one or more user-selected images from the displayed images of the plurality of items related to the foreground object;

generating a product release image corresponding to the product, wherein the product release image comprises both (1) the foreground object cut out from the input image according to the determined outline and (2) the one or more user-selected images.

\* \* \* \* \*